(12) United States Patent
Marshall

(10) Patent No.: US 7,173,601 B2
(45) Date of Patent: Feb. 6, 2007

(54) METHOD AND APPARATUS FOR PROVIDING POSITION FEEDBACK OF AN OPTICAL DITHERING ELEMENT

(75) Inventor: Stephen W. Marshall, Richardson, TX (US)

(73) Assignee: Texas Instruments Incorporated, Dallas, TX (US)

(*) Notice: Subject to any disclaimer, the term of this patent is extended or adjusted under 35 U.S.C. 154(b) by 575 days.

(21) Appl. No.: 10/753,144

(22) Filed: Jan. 7, 2004

(65) Prior Publication Data

US 2005/0145806 A1  Jul. 7, 2005

(51) Int. Cl.
*G09G 3/34* (2006.01)

(52) U.S. Cl. .......................... 345/107; 345/81
(58) Field of Classification Search ................ 345/55, 345/87, 88, 102, 690, 697; 348/673; 315/169.3; 349/61–67

See application file for complete search history.

(56) References Cited

U.S. PATENT DOCUMENTS 5,146,463 A * 9/1992 Rando ........................ 372/24
5,838,813 A * 11/1998 Kancler et al. ............. 382/103
6,816,141 B1 * 11/2004 Fergason ...................... 345/88

OTHER PUBLICATIONS

U.S. Patent Application entitled "*Damped Control of a Micromechanical Device*"; U.S. Appl. No. 10/749,497 (27 pgs.), filed Dec. 31, 2003.

* cited by examiner

*Primary Examiner*—Nitin Patel
(74) *Attorney, Agent, or Firm*—Charles A. Brill; Wade James Brady, III; Frederick J. Telecky, Jr.

(57) ABSTRACT

According to one embodiment, a method for providing position feedback for a device includes providing a photo-interrupter having a light-emitting diode, a phototransistor, and an aperture between the light-emitting diode and the phototransistor. For a given size aperture, a current through the phototransistor is a function of a current through the light-emitting diode. The method also includes controlling the current through the light-emitting diode current such that a change in the effective aperture size results in a desired approximately proportional change in current through the phototransistor. While controlling the current through the light-emitting diode, a portion of the aperture is blocked by an arm that has a position indicative of the position of the device. The method also includes providing a signal indicative of the change in current through the photodiode as an indication of the change in position of the device.

20 Claims, 13 Drawing Sheets

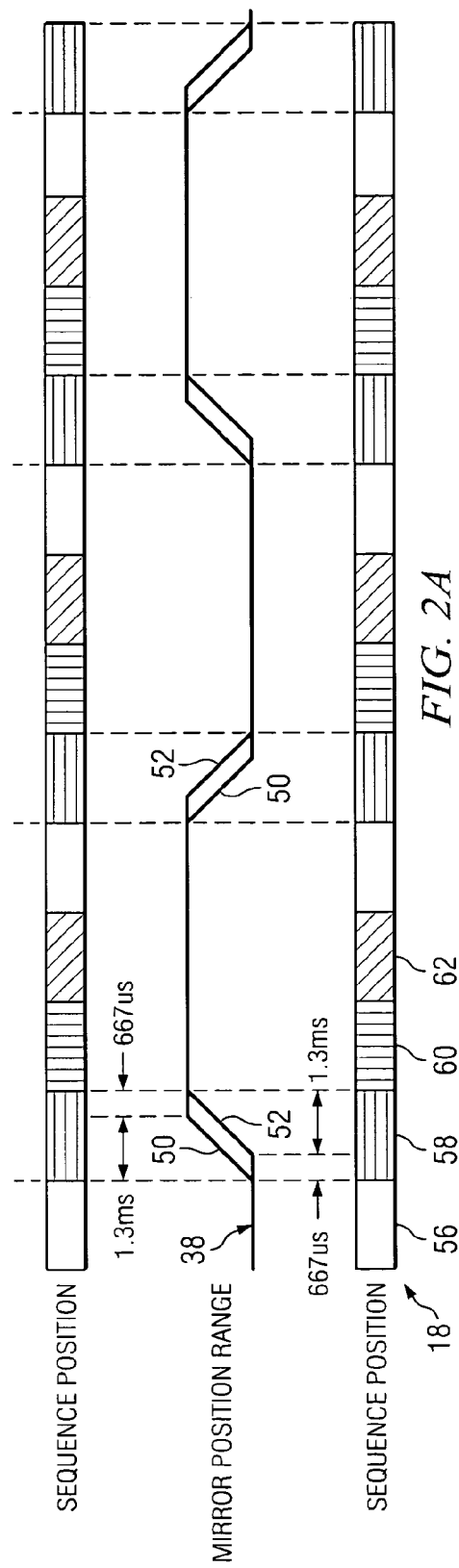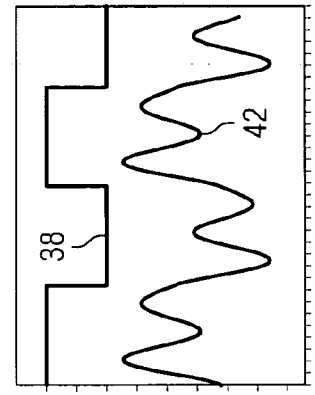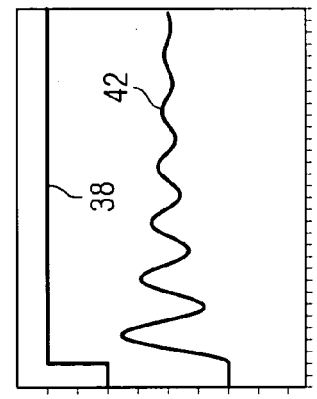

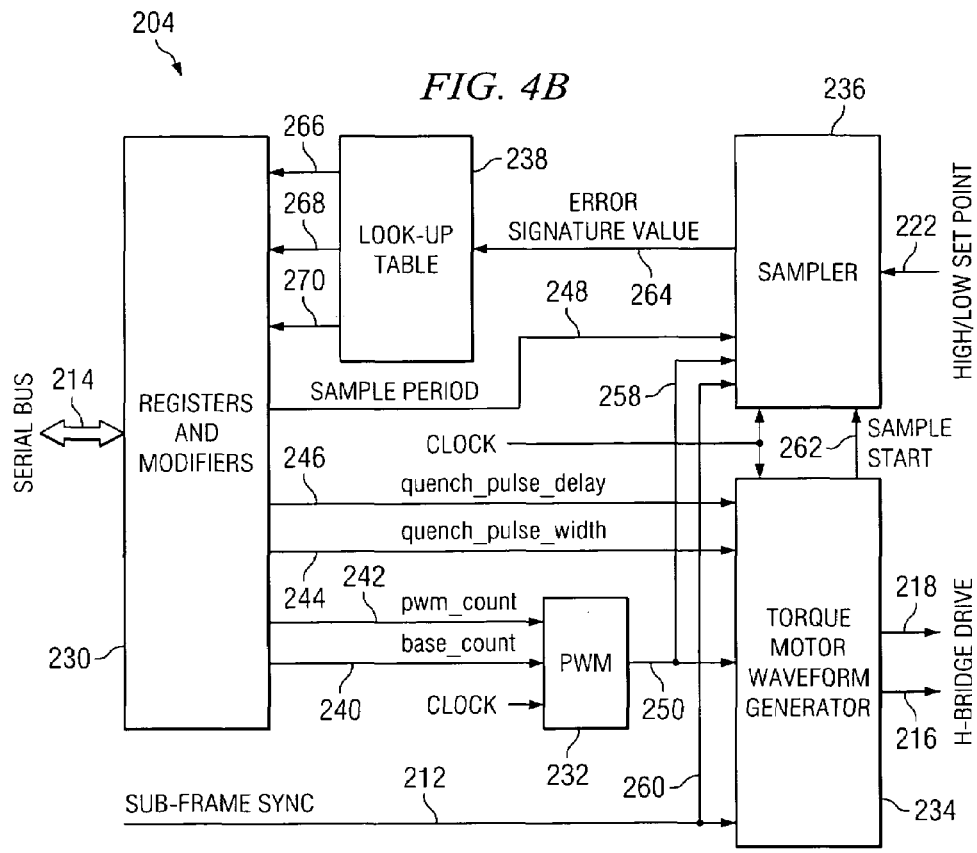
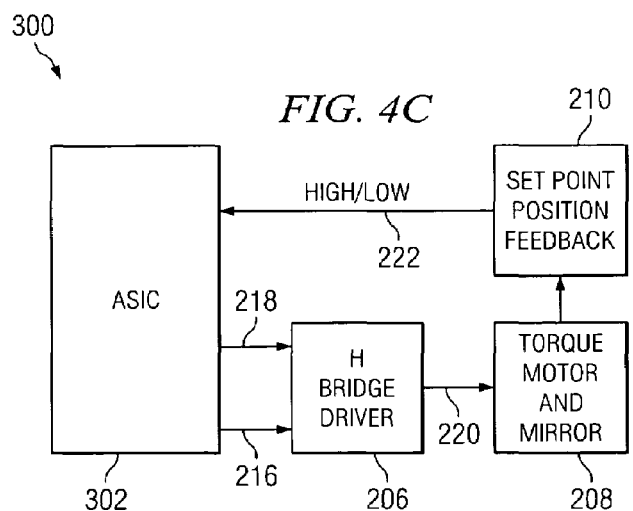

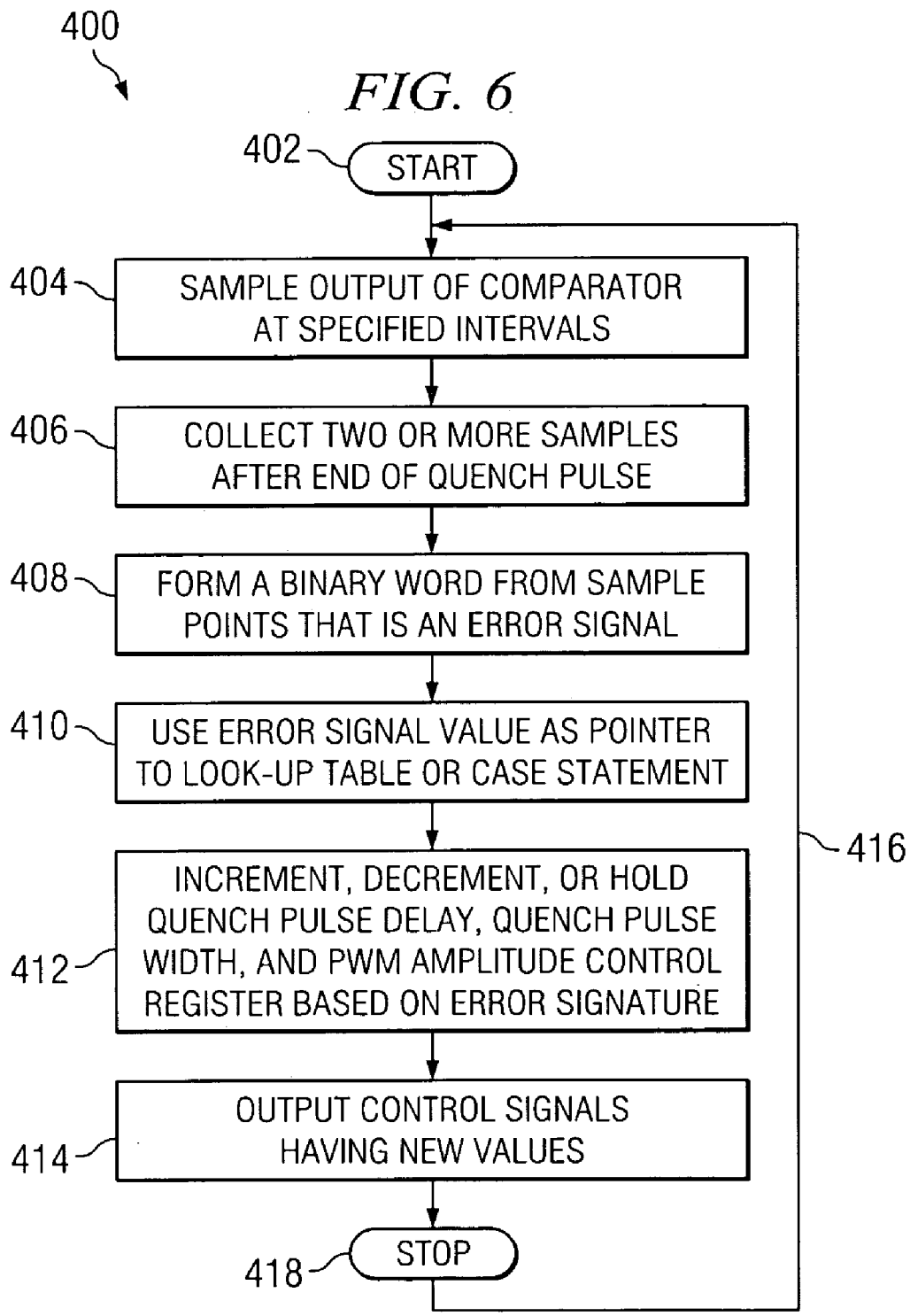

| SIGNATURE | DELAY | PW | PWM |
|---|---|---|---|
| 0 | 0 | 0 | +1 |
| 1 | 0 | 0 | 0 |
| 2 | -1 | -1 | +1 |
| 3 | -1 | -1 | 0 |
| 4 | +1 | -1 | +1 |
| 5 | 0 | 0 | 0 |
| 6 | 0 | -1 | 0 |
| 7 | 0 | -1 | 0 |
| 8 | +1 | +1 | +1 |
| 9 | 0 | 0 | 0 |
| 10 | 0 | 0 | 0 |
| 11 | 0 | 0 | 0 |
| 12 | +1 | 0 | 0 |
| 13 | +1 | +1 | -1 |
| 14 | +1 | -1 | 0 |
| 15 | +1 | -1 | -1 |
| 16 | -1 | +1 | +1 |
| 17 | -1 | +1 | +1 |
| 18 | 0 | 0 | 0 |
| 19 | -1 | 0 | 0 |
| 20 | 0 | 0 | 0 |
| 21 | 0 | 0 | 0 |
| 22 | 0 | 0 | 0 |
| 23 | -1 | -1 | -1 |
| 24 | +1 | +1 | +1 |
| 25 | 0 | +1 | 0 |
| 26 | 0 | 0 | 0 |
| 27 | -1 | +1 | -1 |
| 28 | +1 | +1 | 0 |
| 29 | +1 | +1 | -1 |
| 30 | 0 | 0 | 0 |
| 31 | 0 | 0 | -1 |

*FIG. 8*

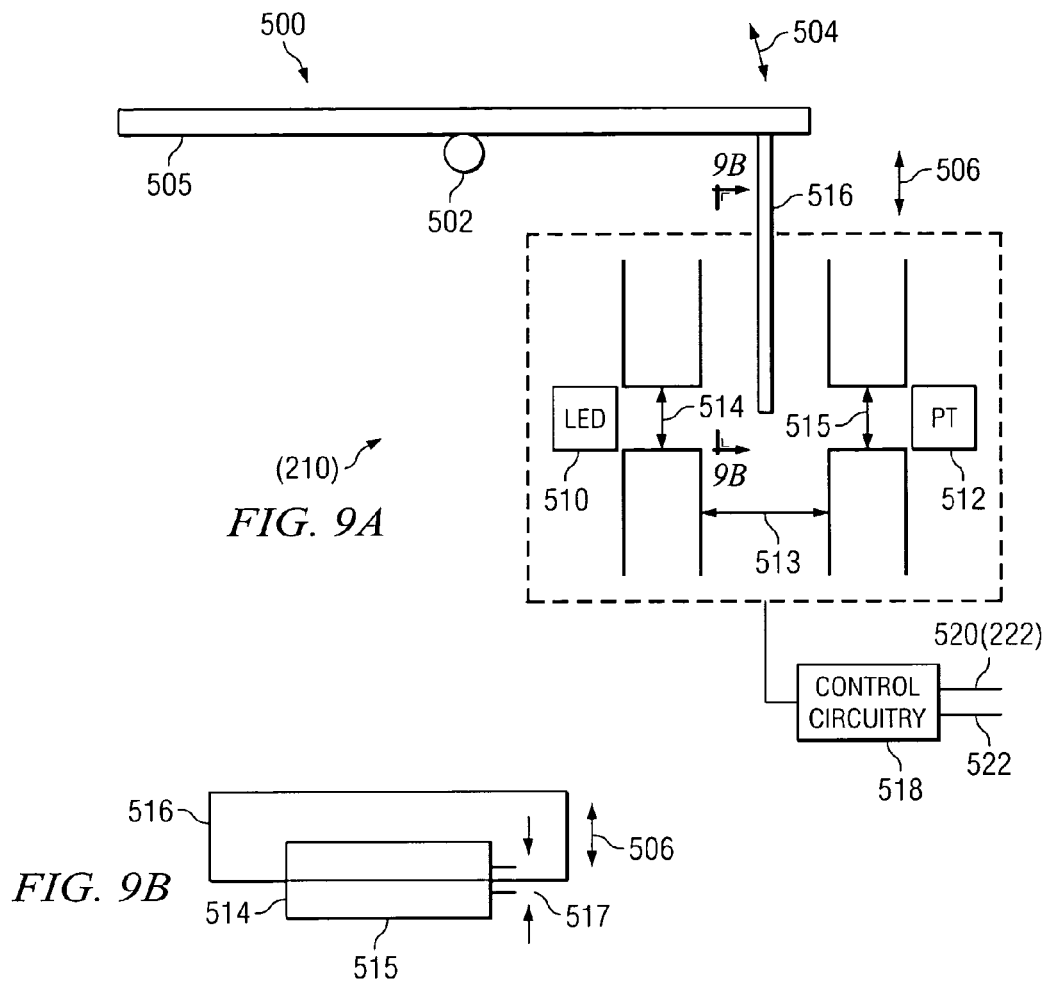
FIG. 9A
FIG. 9B
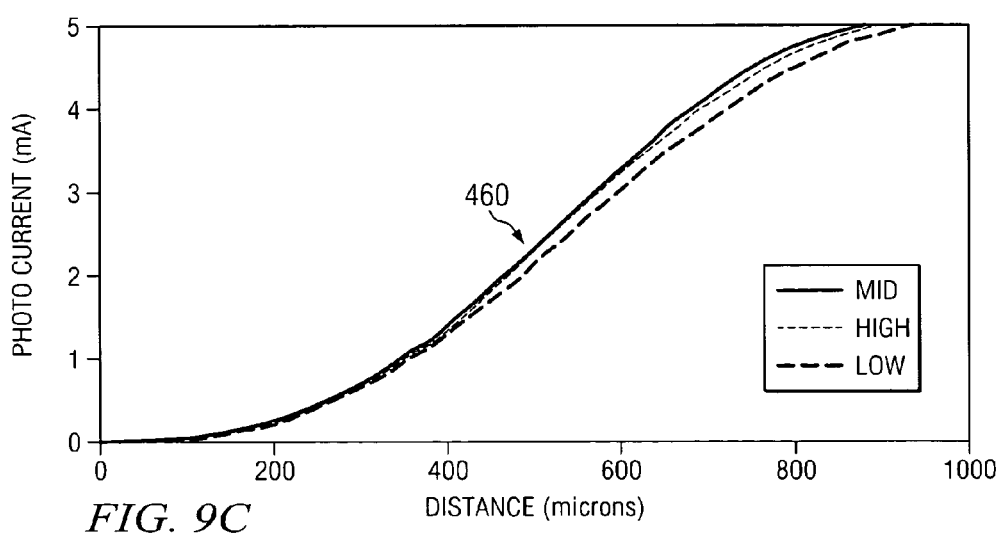
FIG. 9C

METHOD AND APPARATUS FOR PROVIDING POSITION FEEDBACK OF AN OPTICAL DITHERING ELEMENT

TECHNICAL FIELD OF THE INVENTION

This invention relates generally to optical dithering and more particularly to a method and apparatus for providing position feedback for an optical dithering element.

BACKGROUND OF THE INVENTION

Televisions and other types of displays are pervasive in today's society. Recent years have seen the introduction of higher definition displays. Engineers continue to try to increase the resolution of displays to provide better picture quality, but also face constraints associated with providing such increased resolution.

One approach for increasing the resolution of a display involves increasing a perceived resolution of a display by a user. Rather than providing more pixels, a first image is displayed including a set number of pixels corresponding to the same number of sample data points of the image to be displayed. Then at a time period very close to the display of the first image, a second image is displayed including the same number of pixels but with slightly different sample points of the image. This second image on the display is offset by a small amount from the display of the first image. The human eye perceives both images as being displayed at the same time, resulting in an effective doubling of the display resolution. This technique is referred to in the industry by many names including modulation, optical dithering, and SmoothPicture™.

In one technique for effecting the offset of the two images, a mirror is used as an optical dithering element to direct light corresponding to pixels to be displayed onto the display. The mirror is repeatedly switched from one position to another such that the first position of the mirror corresponds to a display of an unshifted image and the second position corresponds to a display of a shifted image. Thus rapid positioning of the mirror between the first and second positions allows an increase in the perceived resolution of the display.

In order to control the position of an optical dithering element, it is useful to measure the position of the optical dithering element. However, such a measurement can often be costly, adding undue expense to the underlying product.

SUMMARY OF THE INVENTION

According to one embodiment, a method for providing position feedback for a device includes providing a photointerrupter having a light-emitting diode, a phototransistor, and an aperture between the light-emitting diode and the phototransistor. For a given size aperture, a current through the phototransistor is a function of a current through the light-emitting diode. The method also includes controlling the current through the light-emitting diode such that a change in the aperture size results in a desired approximately proportional change in photocurrent through the phototransistor. While controlling the current through the light-emitting diode, a portion of the aperture is blocked by an arm that has a position indicative of the position of the device. The method also includes providing a signal indicative of the change in current through the photodiode as an indication of the change in position of the device.

Some embodiments of the invention provide numerous technical advantages. Some embodiments may benefit from some, none, or all of these advantages. For example, according to one embodiment, a low-cost position feedback signal is generated by using a photointerrupter that allows fine tuning the position of an optical dithering element. Thus, the position of an optical dithering element can be controlled without the use of expensive servo systems. Other technical advantages may be readily ascertainable by one of skill in the art.

BRIEF DESCRIPTION OF THE FIGURES

For a more complete understanding of the invention, and for further features and advantages, reference is now made to the following description, taken in conjunction with the accompanying drawings, in which:

FIG. 2A is a graph illustrating a desirable transition of the mirror of FIG. 1 from a first position to a second position;

FIG. 2B is a graph illustrating a position versus response curve for the mirror of FIG. 1 during transition without a control signal controlling the position response of the mirror;

FIG. 2C is a graph illustrating the position of the mirror with respect to time for numerous transitions of the mirror between first and second positions without use of a control signal to control the response;

FIG. 4B is a block diagram of the field programmable gate array controller of FIG. 4A, according to one embodiment of the invention;

FIG. 4C is a block diagram of the dither control architecture according to a second embodiment of the invention;

FIG. 6 is a flowchart illustrating a method for controlling an optical dithering element according to the teachings of the invention;

FIG. 7A is an error signature map corresponding to the drive waveform having a low amplitude;

FIG. 8 is a table illustrating a plurality of error signatures and the corresponding adjustment to delay width and magnitude of the drive signal;

FIG. 9A is a schematic diagram illustrating an optical dithering element and an associated position measurement system according to the teachings of the invention;

FIG. 9B is a schematic diagram along the lines 9B—9B of FIG. 9A showing additional detail of the aperture and the device arm of FIG. 9A;

FIG. 9C is a graph illustrating the photocurrent versus distance for the photointerrupter of FIG. 9A;

DETAILED DESCRIPTION OF THE INVENTION

Embodiments of the invention and its advantages are best understood by referring to FIGS. 1–11 of the drawings, like numerals being used for like and corresponding parts of the various drawings.

Figure 1:
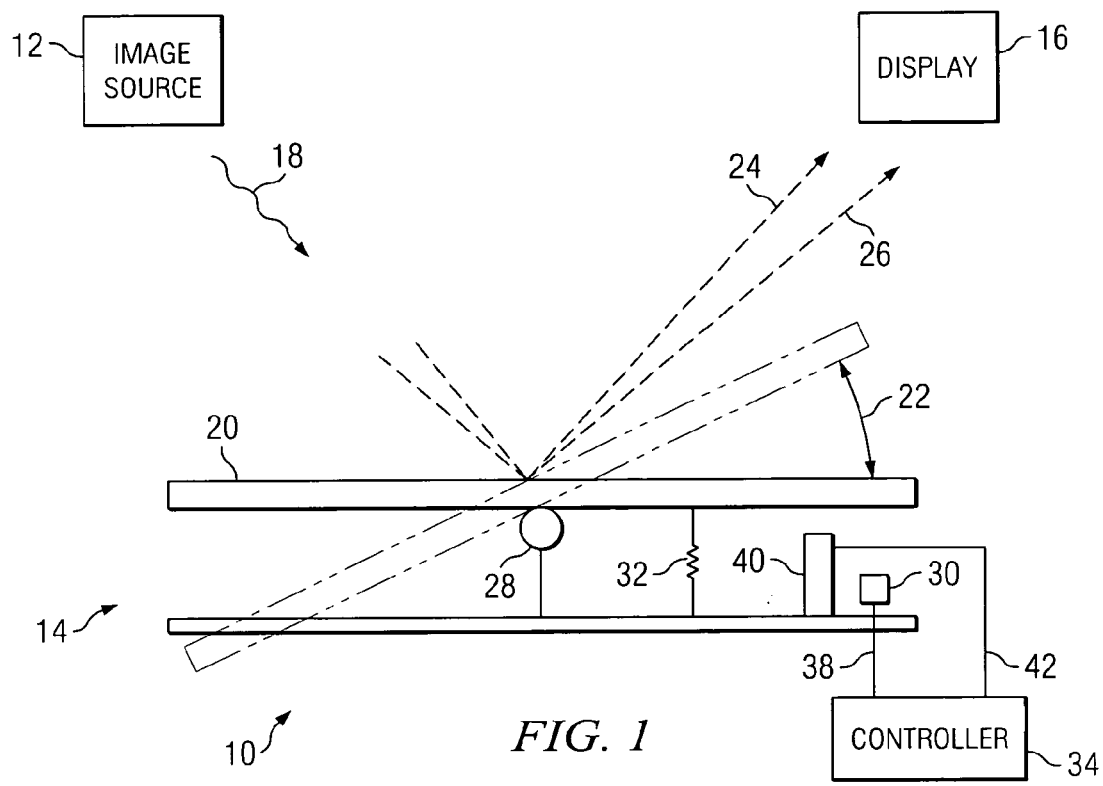
FIG. 1 is a schematic diagram illustrating a system for displaying light with increased perceived resolution according to the teachings of the invention.

FIG. 1 is a schematic diagram illustrating a system 10 for displaying an image with increased perceived resolution. System 10 includes an image source 12, an optical dithering system 14, and a display 16. Image source 12 is operable to generate light 18 representative of an image for eventual display on display 16. According to one embodiment, image source 12 comprises a digital micro-mirror device (DMD), available from Texas Instruments, for selectively modulating light to represent an image. In one embodiment, image source 12 may sequentially generate light of different colors and provide those different colors in sequence for display on display 16. Image source 12 may provide these different colors for appropriate time periods such that a user's eye viewing the light on display 16 will integrate the various colors to result in a desired color to be displayed. According to one embodiment in which image source 12 is a DMD, the number of mirrors in the DMD is equal to the unenhanced resolution of the display of display 16. Thus image source 12 may provide an array of light signals 18 for eventual display on display 16.

Optical dithering system 14 receives light signals 18 and reflects them onto display 16. Optical dithering system 14 includes an optical dithering element 20, which may be a lens, mirror, or other device operable to selectively direct light to a desired location. In the present example, optical dithering element 20 is a mirror. Mirror 20 rotates about an angle 22 between first and second positions to selectively reflect light 18 from image source 12 to display 16 into one of two positions. In one embodiment, angle 22 is very small and on the order of 0.015 degrees. This corresponds to approximately four microns of vertical movement of the end of mirror 20. Thus, mirror 20 produces an offset light beam 24 and an unoffset light beam 26 for display on display 16. If mirror 20 is rotated sufficiently rapidly between these two positions, display 16 appears to have a resolution equal to twice the unenhanced resolution. It should be noted that the perceived resolution of display 16 could be increased by a factor of four, rather than two, if mirror 20 is rotated about two axes rather than just one axis. The teachings of the invention may be incorporated into such a system as well.

Mirror 20 rotates about a pivot point 28. An actuator 30, which in one embodiment is a voice coil, either pushes or pulls mirror 20 up or down to effect movement between the first and second positions. Actuator 30 may take other forms that are operable to effect movement of mirror 20. A spring 32 is coupled to mirror 20 such that the resulting movement of mirror 20 is approximately proportional to the force applied by actuator 30. By utilizing spring 32, which provides an approximately proportional response between a force applied and position of the spring, control of the position of mirror 20 is facilitated.

A controller 34 is provided to control actuator 30 such that mirror 20 is rotated between first and second positions in a desirable manner. Controller 34 communicates with actuator 30 over line 38. Controller 34 may take any suitable form, such as an ASIC or an FPGA, and may be programmed according to the teachings of the invention as described in greater detail below.

A position sensor 40 provides an indication of the position of mirror 20. Feedback from position sensor 40 may be provided to controller 34; however, as described in greater detail below, feedback of the position of mirror 20 has a limited role in one embodiment. Any suitable position sensor may be used that provides an indication of the position of mirror 20; however, according to one embodiment, the position sensor described in FIGS. 9A through 11 is utilized.

One challenge recognized by the invention with transitioning mirror 20 from a first position to a second position involves overshoot and ringing of the position of mirror 20. Actuator 30 may apply a force to mirror 20 to cause it to start moving from a first position to a second position (or between multiple positions in other embodiments), but causing mirror 20 to stop at the second position requires some control. One approach for solving this problem would be to provide a position feedback signal such that a servo control loop could precisely control the position of mirror 20 and it could transition from a first position to a second position with minimal overshoot. However, such a control system would require a high bandwidth feedback and a very rapid control system, both of which would significantly increase costs associated with mirror system 14.

According to the teachings of the invention, rather than providing a control feedback loop and precisely controlling the position of mirror 20 during its transition from a first position to a second position, a predetermined control waveform is transmitted from controller 34 to actuator 30 over line 38 that effects a desirable position versus time response of mirror 20 during transition from its first position to its second position and then back to its first position. By utilizing a predetermined waveform, lower cost components may be used and expensive and high bandwidth feedback control systems are not required. Additional details of such a control signal are described in greater detail below in conjunction with FIGS. 2A through 3C.

FIG. 2A is a series of graphs illustrating the transition of mirror 20 from a first position to a second position. The top graph of FIG. 2A illustrates the position of mirror 20 as mirror 20 transitions from a first position to a second position, and includes curves 50 and 52. The bottom graph is an indication of a particular color of light 18 provided by image source 12 for a given pixel that is being displayed at a particular time. It should be noted that image source 12 generates such a signal for a large number of pixels. According to one aspect of the invention, it has been determined that transitioning mirror 20 from a first position to a second position is desirable to be performed in a time period in which only blue light, if any, is displayed. As described above, in one embodiment, light 18 is provided sequentially in various colors and the user's eye integrates these colors to generate a desired color to be displayed. The proportion of the time frame in which any particular color may be transmitted determines the resulting color. Light 18 includes, in this embodiment, white light 56, blue light 58, red light 60, and green light 62. Thus, in the time period in which blue light 58 may be displayed the teachings of the invention recognize that mirror 20 should be transitioned during this time period. This is because transitioning while blue light is displayed is less perceptible to a viewer's eye than transitioning while other colors are displayed because the human eye has its lowest spatial response in blue light and blue light produces the fewest lumens. It should be noted that although transitioning normally occurs during this time period it is not necessarily the case that blue light is displayed. Rather, this time period is the time period in which no color other than blue may be displayed. Transitioning may also occur during the time period dedicated to transmitting other colors of light, if any, that are determined to result in a desirable lack of perception by a viewer of the transition.

Curves 50 and 52 indicate that, according to one embodiment, a range of transition profiles may take place such that transitioning from a first position to a second position of mirror 20 occurs within the time period associated with blue light transmission. FIG. 2A also illustrates that transitioning back from a second position to a first position also occurs during the time period in which the blue light may be displayed. As illustrated, a generally trapezoidal response in which the position of mirror 20 rises quickly from a first position to a second position is desirable. In one embodiment, the transition from a first position to a second position occurs in about 1.3 milliseconds.

FIG. 2B is a graph illustrating a position versus time graph of mirror 20 resulting from a step control signal 38 provided by controller 34. Because optical dithering system 14 is a spring mass system, a step response for control signal 38 such as that illustrated in FIG. 2B results in transitioning from a first position to a second position with a time versus response curve 42 illustrated in FIG. 2B. Thus, mirror 20 overshoots its desired position, swings back, and continues to oscillate for some time period before it comes to a generally resting position at the desired second position. This type of response is undesirable, and would result in a fuzzy image on display 16.

FIG. 2C is analogous to FIG. 2B but illustrates the response of mirror 20 in moving from a first position to a second position and then back to the first position repeatedly over time in response to control signal 38. As illustrated, mirror 20 overshoots its desired position and begins to oscillate until the next period of control signal 38 is provided, in which case mirror 20 again overshoots in the opposite direction, resulting in an undesirable response. As described above, controlling this undesirable response through use of a feedback control system would be prohibitively expensive. Thus, according to the teachings of the invention, a predetermined control signal is provided that addresses the undesirable response curves for position signal 42 of FIGS. 2B and 2C.

Figure 3A:
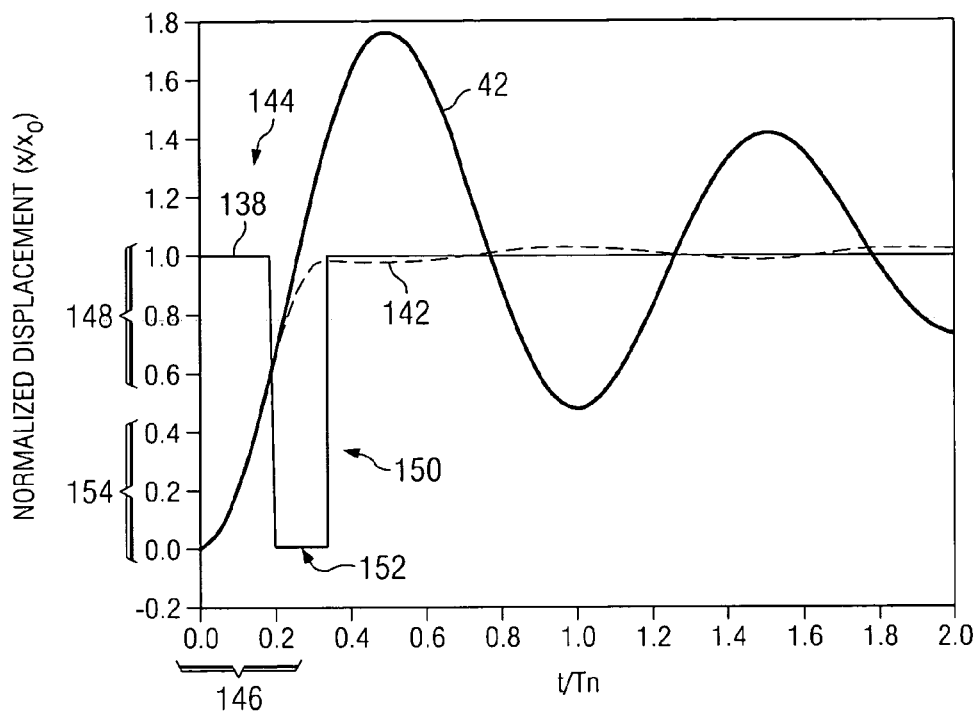
FIG. 3A is a graph illustrating a desirable response, a control signal used to develop a desirable response, and an undesirable response of the system of FIG. 1.

FIG. 3A illustrates a desirable response curve 142 of mirror 20 in moving from a first position to a second position as well as the associated control signal 138. Control signal 138 is determined, as described in greater detail below, based upon modeling of the spring mass system of optical dithering system 14 and its characteristics are predetermined independent of the operation of mirror 20. Thus, the position of mirror 20 at any given time is not utilized to determine the characteristics of control signal 138. However, as described in greater detail below, the characteristics of predetermined control signal 138 may be tuned based upon the position response of mirror 20 in previous transitions.

As illustrated, desirable response curve 142 quickly rises from a first position to a second position with little overshoot and ringing. This is in contrast to undesirable response curve 42 with significant overshoot and ringing. Predetermined control signal 138 comprises, in this example, an initial step 144 having a pulse width 146 and a magnitude 148. Predetermined control signal 138 also includes a quench pulse 150 having a width 152 and a magnitude 154 that is equal in magnitude but the opposite polarity of magnitude 148, in this embodiment. Step width 146 of initial step 144 is also referred to herein as quench pulse delay 146 because it indicates the delay of quench pulse 152. System modeling has determined that, according to one embodiment, step width 146 of the initial step pulse 144 would last for about twenty percent of the resonant response period. The resonant response period herein refers to the period associated with the natural frequency of the spring mass system. It has further been determined that the width of quench pulse 152 would be about fourteen percent of the resonant response period, in one embodiment. Thus for a 250 Hz system, the quench pulse 150 would have an offset of about 0.8 milliseconds and a hold time of 0.55 milliseconds. The ratio between the offset and hold times is dependent on the mechanical Q of the system.

It should be noted that the predetermined control signal 138 is one example of a predetermined waveform that provides a desirable response. Other waveform shapes, magnitudes, and frequencies may be utilized based on modeling of the system to be controlled. As another example, a control signal may be provided that is analogous to control signal 138 illustrated in FIG. 3A, but in which the magnitude of the control signal after the quench pulse has a reduced value; however, many other types of control signals may be used A narrower quench pulse may be used with more highly-damped or lower Q systems because less energy is required to damp out the overshoot and ringing in such systems.

Figure 3B:
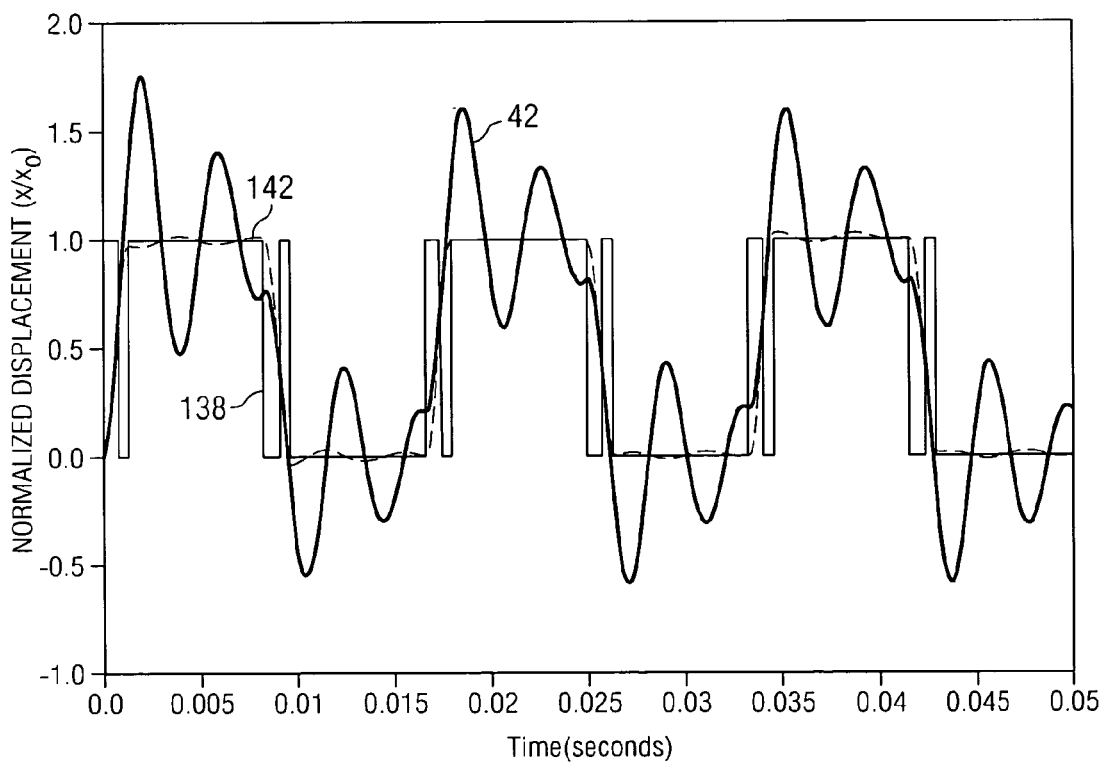
FIG. 3B is a graph analogous to FIG. 3A but illustrates several periods of responses and associated control signals for the position of the mirror of FIG. 1.

FIG. 3B is analogous to FIG. 3A but shows the response over time characteristics of control signal 138, response curve 142, and undesirable position signal 42.

Figure 3C:
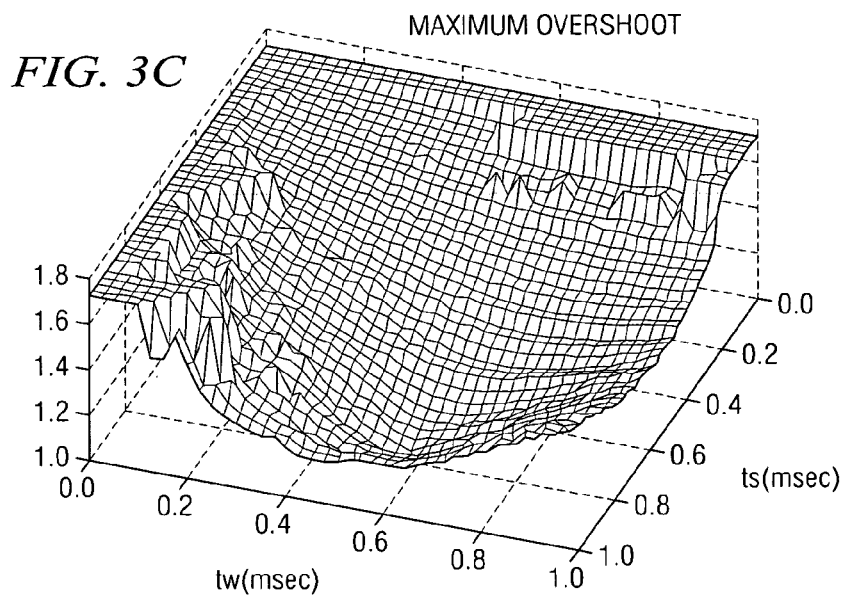
FIG. 3C is a graph illustrating overshoot versus a plurality of parameters that may be used to determine a desirable control signal for the system of FIG. 1.

FIG. 3C is a three-dimensional graph illustrating the overshoot amplitudes that occur for signal 142 for various combinations of width 152 of quench pulse 150 and width 146 of step pulse 144 (or quench pulse delay). As illustrated, the minimum overshoot occurs at a combination corresponding to the time periods described above. Although the particular combination of pulse widths may vary according to the characteristics of mirror 20, spring 32, and other associated components, the teachings of the invention recognize that such characteristics may be modeled and a desirable control signal 138 may be determined a priori and thus a high bandwidth feedback control system is not required. However, the teachings of the invention also recognize that there may be some disparity between the modeled parameters and the actual parameters for any given mirror system 14. Thus, a feedback signal 42 is provided to controller 34 to allow fine tuning of widths 146 and 152 based on actual system parameters to fine tune the predetermined control signal. This fine tuning is described in conjunction with FIGS. 4A through 8 below.

Figure 4A:
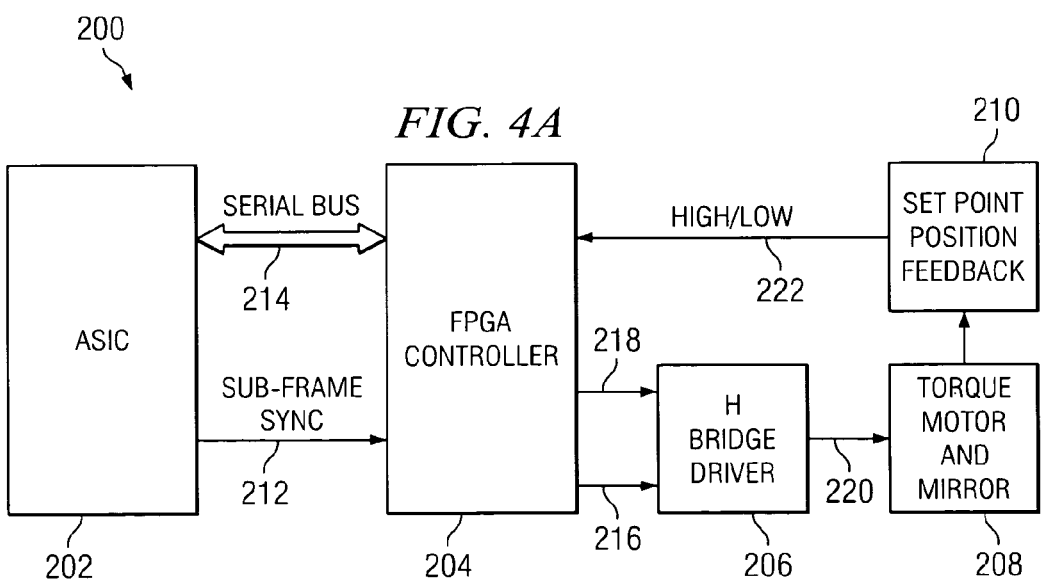
FIG. 4A is a block diagram of the dither control architecture according to one embodiment of the invention.

FIG. 4A is a block diagram of a system for controlling the positioning of an optical dithering element, such as mirror 20. System 200 includes, in this embodiment, an application specific integrated circuit (ASIC) 202, a field programmable gate array (FPGA) 204, a bridge driver 206, a torque motor and mirror 208, and a setpoint position feedback block 210. FPGA 204 may correspond to controller 34 of FIG. 1 and torque motor and mirror block 208 may correspond to voice coil 30 and mirror 20 of FIG. 1.

ASIC 202 has a primary purpose of controlling modulation of image source 12 to produce light 18. However, field programmable gate array 204 receives from ASIC 202 a sub-frame sink signal over line 212 such that field programmable gate array 204 may control movement of optical dithering element 20 such that movements of optical dithering element 20 are aligned at an appropriate point in time with respect to the transmission of light 18, such as is shown in FIG. 2A. A serial bus 214 is provided between FPGA 204 and ASIC 202 for writing initial delay and hold time, sample period, and amplitude data to the FPGA and for reading back operational status data from the FPGA. FPGA controller 204's primary purpose is to control movement of optical dithering element 20. FPGA controller 204 produces a differential drive signal over lines 216 and 218 and provides this signal to bridge driver 206. FPGA controller 204 receives feedback over line 222 as described in greater detail below. Bridge driver 206 provides the drive signal that drives the torque motor associated with optical dithering element 20, which in one example is voice coil motor 30. Setpoint position feedback block 210 represents the measurement of the position of optical dithering element 20 and determination of whether the position is higher or lower than a desired setpoint. This indication is provided to FPGA controller 204 over line 222. In one embodiment, the sampling rate of the position of optical dithering element 20 is about 1000 Hz or four times the natural resonant frequency of the system.

In operation, FPGA controller 204 provides a predetermined waveform over differential pair 216 and 218 to bridge driver 206. Bridge driver 206 in turn drives the torque motor associated with optical dithering element with an associated waveform. The resulting position versus time of the optical dithering element is compared at a plurality of sample points to the desired setpoint and an error indication of whether the actual position exceeded or fell below the desired setpoint is provided over line 222 to FPGA controller 204. In response to this feedback, FPGA controller 204 modifies the waveform transmitted over lines 216 and 218 to compensate for differences between the of the optical dithering element at the sample points and the desired setpoint. Additional details of this modification are described below in conjunction with FIG. 4B.

FIG. 4B is a block diagram illustrating portions of FPGA controller 204 according to one embodiment of the invention. FPGA controller 204 includes a registers and modifiers block 230, a pulse width modulator 232, a torque motor waveform generator 234, a sampler 236, and a look-up table 238.

Registers and modifiers block 230 comprise a plurality of registers for storing appropriate data signals and associated logic for modifying the data stored in the registers in response to received feedback. Pulse width modular 232 produces a waveform for controlling the magnitude of the drive waveform generated by torque motor waveform generator 234. Sampler 236 samples the output of the analog comparator of setpoint position feedback block at predetermined sample intervals. In addition, sampler 236 generates an error signature based upon the sampled signals as described in detail below and provides the error signature to look-up table 238. Look-up table 238 determines, based upon the received error signal, modifications to the quench pulse delay, the quench pulse width, and the PWM count to produce a more desirable position versus time curve of optical dithering element 20 for subsequent transitions. These modifications are provided as increments and decrements to the predetermined values corresponding to the predetermined waveform (such as control signal 138), which are stored in registers and modifiers block 230. Based on these modifications, revised values are provided by registers and modifiers block 230 to the pulse width modulator 232 and torque motor waveform generator 234, as described in greater detail below.

Registers and modifiers block 230 produces five signals: a base count 240, a pulse width modulation count 242, a quench pulse width 244, a quench pulse delay 246, and a sample period 248. Together base count 240 and pulse width modulation count 242 control pulse width modulator 232 such that the magnitude of the drive signals on 216 and 218 is appropriate. Quench pulse width signal 244 controls the width of the quench pulse produced at lines 216 and 218. Quench pulse delay signal 246 controls the delay of the quench pulse of a drive waveform at lines 216 and 218. The output of pulse width modulator 232 is provided over line 250 to torque motor waveform generator 234. The rising edges of the H-bridge drive waveforms on lines 216 and 218 are synchronized to the rising edge of PWM signal on line 250. This output is also provided to sampler 236 over line 258, as is a sub-frame sink signal over line 260. At line 222 an indication of whether the position of optical dithering element exceeds or falls below a desired setpoint is provided to sampler 236.

Sampler 236 takes samples of this high or low signal at appropriate time periods. According to one embodiment of the invention, appropriate time periods correspond to quadrature points based on the natural frequency of the inertia/torsion spring system of optical dithering system 14. Thus, according to one embodiment, samples are taken every 90 degrees of the natural resonant frequency of optical dithering system 14. Quadrature sampling allows characterization of both the magnitude and phase of position errors. Further, in one embodiment, samples begin at the end of the quench pulse as indicated by the sample start signal on line 262 and the sample interval is set by the sample period on line 248. However, sample points may be taken at different times and may begin at different time periods. According to one embodiment, five quadrature sample points are taken; however, any suitable number of samples may be taken, including two samples. Sampler 236 may incorporate a shift register to store a plurality of sample points and then provide a word over line 264 representing an error signature. The word is comprised of a number of bits equal to the number of sample points desired. In one example, in which five quadrature point samples are taken, a five-bit word is provided over line 264 that is the error signature.

Look-up table 238 is indexed by the error signature word 264. Thus, in the example where five samples are utilized, look-up table 238 comprises 32 entries indexed by 32 different possible five-bit words. An example of such a table is described in greater detail in connection with FIG. 8. Based upon look-up table 238, increments or decrements are provided over lines 266, 268, and 270 corresponding to increments or decrements in the stored values associated with quench pulse delay, quench pulse width, PWM count. The PWM count determines the magnitude of the quench pulse. Additional details of the control of optical dithering element 20 and look-up table 238 are described in greater detail below in conjunction with FIGS. 5 through 8.

FIG. 4C is a block diagram of an alternative embodiment of a system 300 for controlling the dithering of optical element 20. System 300 is analogous to system 200 except that the functions of FPGA controller 204 have been incorporated within application-specific integrated circuit 302. Therefore, many of the functions that are executed in firmware of the FPGA controller 204 may be executed in the software as described in greater detail below in conjunction with FIG. 4D.

Figure 4D:
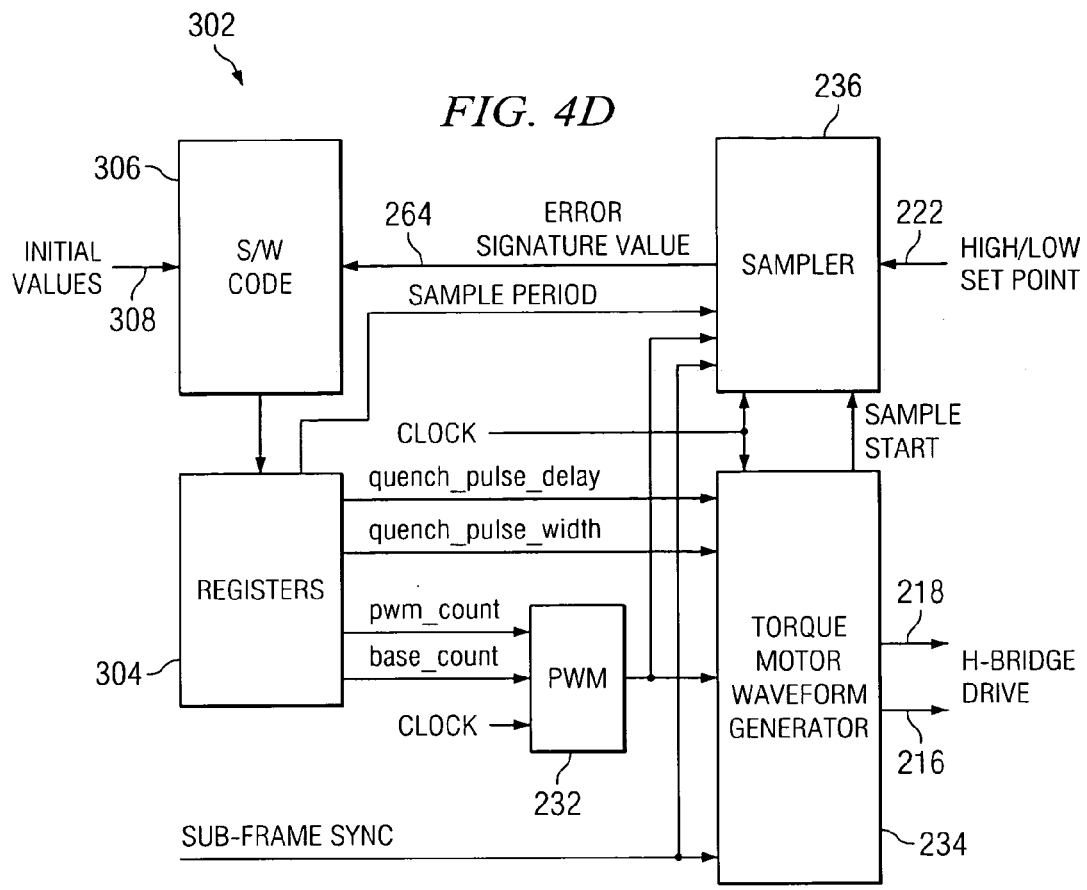
FIG. 4D is a block diagram of an application specific integrated circuit controller of FIG. 4C.

FIG. 4D illustrates portions of ASIC 302 applicable to the control of optical dithering element 20. FIG. 4D is analogous to FIG. 4B except that a software code block 306 is provided. Software code block 306 performs similar functions to that of look-up table 238 of FIG. 4B. Software code block 306 receives initial values over line 308 and modifies these values based upon the error signature 264 in an analogous manner to that described above in conjunction with FPGA controller 204 of FIG. 4B.

Figure 5:
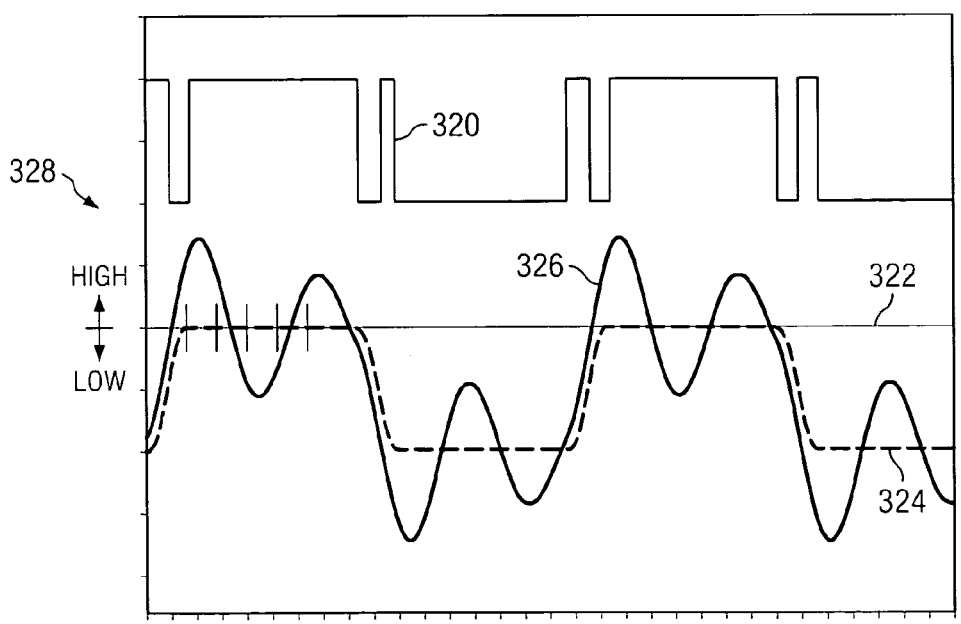
FIG. 5 is a graph illustrating sampling of a plurality of data points for use in control of an optical dithering element according to the teachings of the invention.

FIG. 5 is a graph illustrating a plurality of waveforms associated with control of optical dithering element 20. Waveform 320 is the drive waveform produced at line 220 for driving the motor that positions optical dithering element 20. Waveform 322 represents a setpoint for the desired position of optical dithering element 20. Note that in this embodiment, because the position of the mirror of interest occurs only in the first period of drive waveform 320, a setpoint is a constant value. However, it will be understood that the desired setpoint for optical dithering element 20 varies between two different positions. Waveform 324 corresponds to the desired position versus time response of optical dithering element 20. Waveform 326 corresponds to the undamped, uncontrolled response that would occur for optical dithering element in response to a simple step drive waveform for waveform 320 (without the quench pulse). Quadrature sample points 328 illustrate the location at which a plurality of quadrature samples of the actual position versus time waveform of optical dithering element 20. Thus, if the sampled value falls above setpoint waveform 322 at one of the sample points, an error indicator is generated indicating a high value at that sample point. In one example, a one indicates a high value and a zero indicates a lower value. It should be understood that if the actual position is equal to the setpoint that either a one or a zero could be provided; however, in one embodiment of the invention if the actual position is equal to the setpoint then a zero is generated.

According to the invention, the sign of the difference between the actual position of mirror 20 and the setpoint 322 at each of the sample points 328 is utilized to adjust control signal 320 to reduce overshoot and ringing and produce desired waveform 324.

FIG. 6 is a flowchart illustrating one example of a method for controlling optical dithering element 20. The method begins at step 402. At step 404 the output of a comparator is sampled at specified intervals. In one embodiment, such output could correspond to the output provided over line 222 by an analog comparator within setpoint position feedback block 210. As described above, the specified intervals may occur at the quadrature points corresponding to the natural frequency of optical dithering system 14. In one embodiment, the sampling occurs after the end of quench pulse 150 but could also be coincident with the end of the quench pulse 150. At step 406, two or more of the samples collected at step 404 are combined to form an error signature word. According to one embodiment of the invention five samples are collected; however, two or more samples would also work. At step 408 the binary word that is created from the two or more samples of step 406 create an error signal. At step 410, the error signature value is used as a pointer to a look-up table, in an embodiment in which a look-up table is used. Further, the value of the error signature may also be used as the argument in a case statement, for example where a software program is utilized for the control function.

At step 412, a quench pulse delay timer, a quench pulse width timer, and a pulse width modulation amplitude control register are incremented, decremented, or held based upon the error signature and the sample period is adjusted. According to one embodiment, the sample period is set to 75 percent of the sum of quench pulse delay and quench pulse width. The resulting control signals having the new values are utilized at step 410 to produce a new control signal. The above procedure may be repeated for each transition of optical dithering element 20, as indicated by reference number 416, or may be repeated as desired to result in a control signal that generates a desired position versus time signal of optical dithering element 20. It should be noted that feedback processing and waveform parameter modification can be prioritized to have a low priority and does not need to occur on each cycle because the control waveform will repeat until the next modification. The method concludes at step 418.

According to one embodiment of the invention the increment and decrement values are modified as a function of time from turn on of the system. This allows larger step sizes at start up for faster convergence and then going to smaller step sizes for finer convergence. For example, a series of timer step sizes of 10, 5, 2 and then 1 and pulse width modulation step sizes of 2 and then 1 may be used over the first three seconds of operation. It should also be noted that the initial quadrature-sampling interval is calculated as a percentage of the sum of the initial quench pulse delay and the initial quench pulse width. Modeling systems over a wide range of natural frequencies has shown a 75 percent ratio to be optimum. Thus, the time at which sampling points occur is modified as the quench pulse delay and pulse width change to optimize the drive waveform. If the quadrature-sampling interval is determined based upon a percentage of the quench pulse delay and the quench pulse width, this aspect is taken into account and modifications to the drive waveform produce modifications to the time period for sampling. The incrementing, decrementing or holding of the appropriate values to effect modification of the drive waveform may be determined as described in greater detail below in connection with FIGS. 7A through 7C.

Figure 7A:
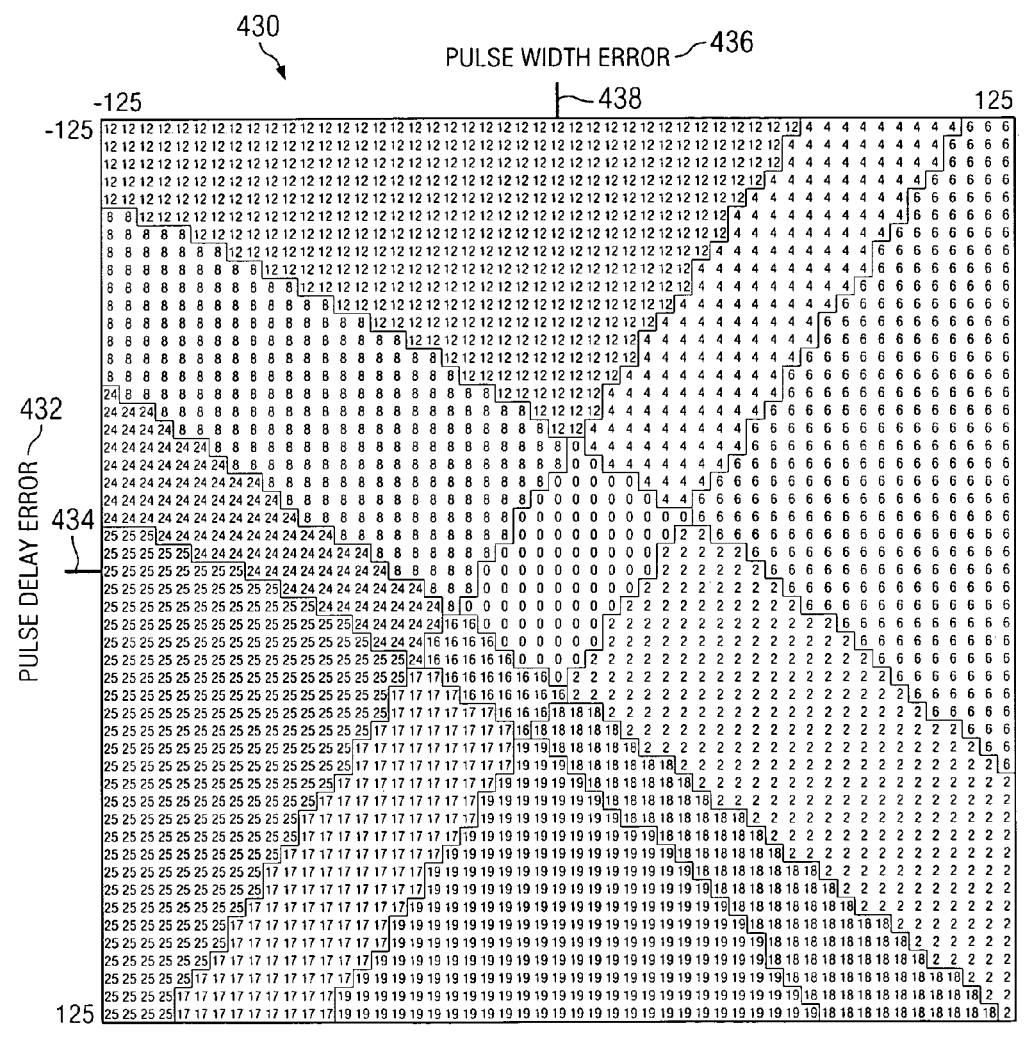
Figure 7B:
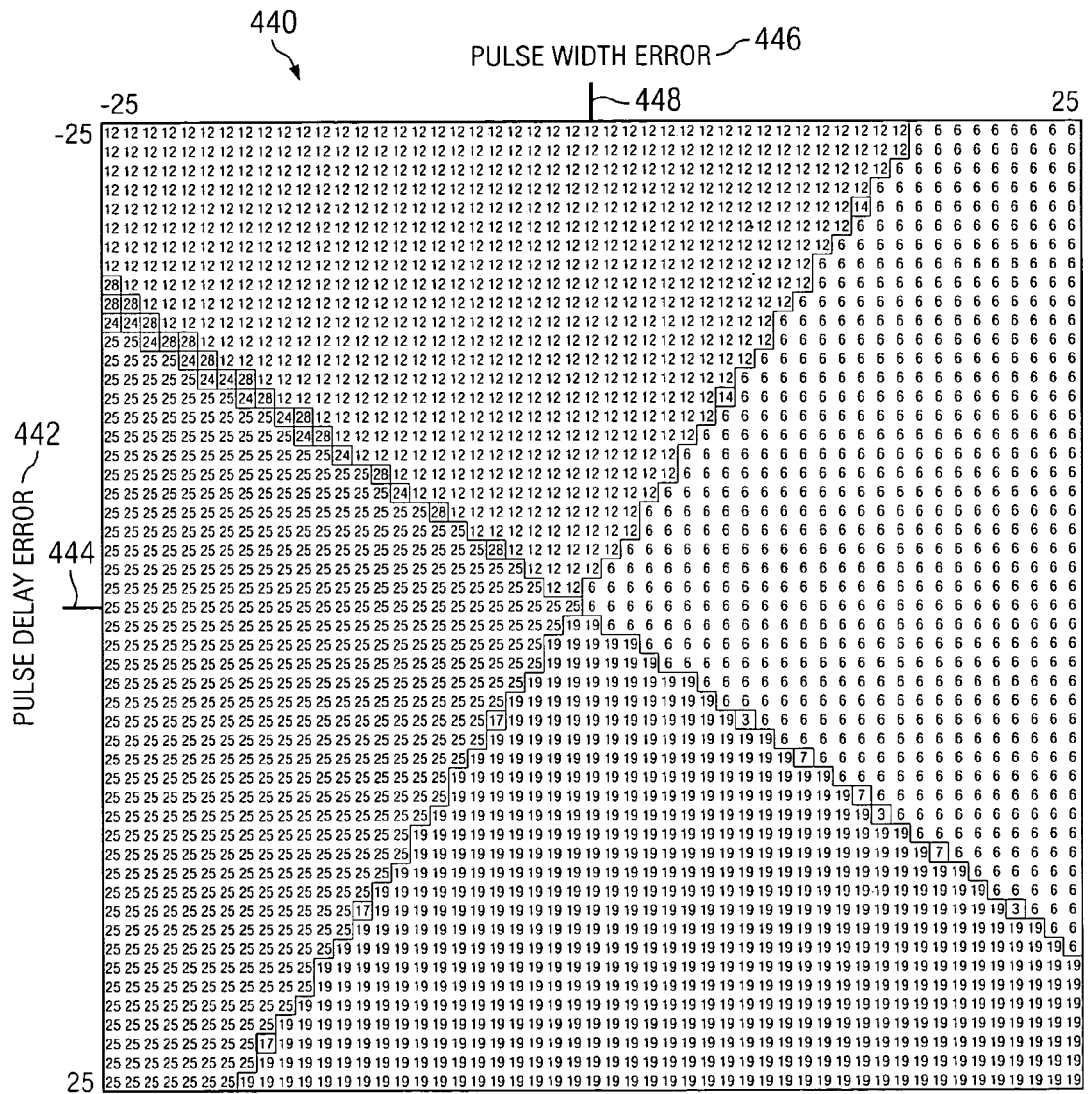
FIG. 7B is an error signature map having the drive waveform of a desired amplitude.
Figure 7C:
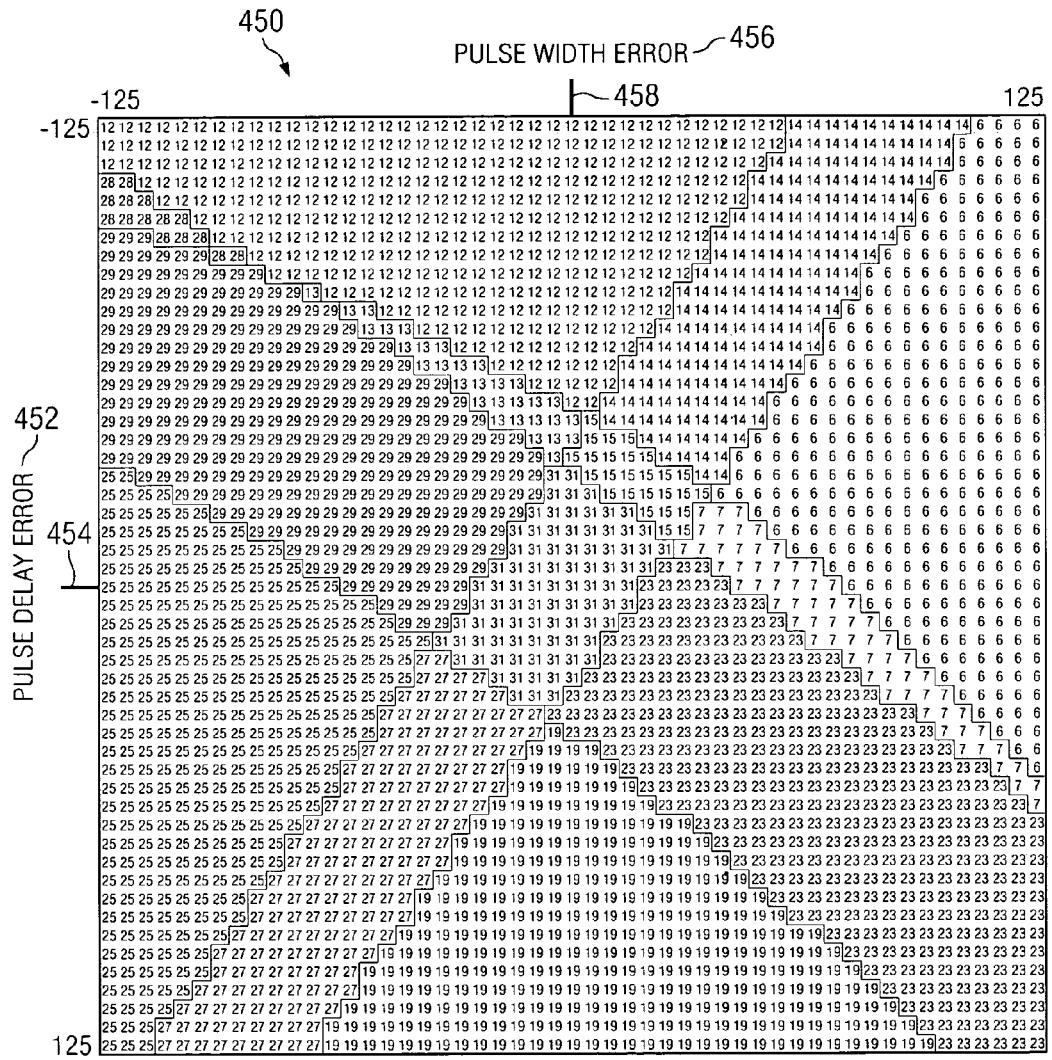
FIG. 7C is an error signature map corresponding to the drive waveform having a high amplitude.

FIGS. 7A through 7C are graphs illustrating error signatures as a function of the pulse delay error and pulse width error for drive waveforms having amplitudes that are low, correct, and high, respectively. Such graphs may be utilized to determine appropriate corrections to the increment, decrement, or hold rules described above. These graphs were generated by introducing known error in the various parameters, determining the resulting error signature, and placing these on these graphs. The error signature maps covered the range of expected errors. Modification rules for each error signature determined by examining its occurrence in each error map and deciding the best course of action to reduce error values and converge to a trapezoidal waveform response. These three graphs show error maps for a five-bit sampling.

With reference to FIG. 7A, an error signature having a value of 25 indicates that the pulse width is too low and should be incremented, whereas an error signature of 6 indicates that the pulse width is too high and should be decremented. An error signature of 25 also indicates that the pulse delay is too high and should be decremented. In contrast, an error signature of 6 does not inform whether a pulse delay is correct or incorrect. Thus by mapping the various error signatures and visually determining an appropriate correction, a look-up table, such as that described below in conjunction with FIG. 8 may be generated. FIGS.

7B and 7C show additional maps for various values of the amplitude parameters. These three graphs as well as others may be combined to generate the modification rules illustrated in Table 461 of FIG. 8.

FIG. 8 is a table showing modification rules for a five-bit error signature for a particular implementation. It should be noted that these rules may differ from system to system, but may be determined based upon the teachings described above of modeling a system and determining appropriate responses due to detected errors. Table 461 comprises a signature error column 462, a delay column 464, a pulse width column 466 and a pulse width modulation count 468. As indicated, any given signature results in a hold, an increment, or a decrement value for each of the relevant parameters.

Thus, by determining whether the desired waveform exceeds or falls below a setpoint at a plurality of sample points, the associated control signal (or drive waveform may be modified for future transitions of optical dithering element 20 to reduce such error. This modification may occur without examining the magnitude of the error of the position of the optical dithering element 20, but rather by merely examining whether it is too high or too low. Such a system may be implemented in a much less costly fashion than a complicated server servo control system.

FIG. 9A is a schematic diagram illustrating measurement of the position of an optical dithering element 500 according to the teachings of the invention. As described above, an optical dithering element 500 (such as optical dithering element 20) may pivot about a point 502 causing rotational movement of optical dithering element 500, as indicated by arrows 504. Rotational movement 504 has an associated translational movement 506. For small angles of rotational movement 504, a translational movement 506 of optical dithering element 500 is essentially in one direction. It is a movement in this direction for which feedback is desired for controlling positioning of optical dithering element 500, as described above. In one embodiment, these movements are very small and may be on the order of 0.015 degrees of rotation and four microns of translation at end 505 of optical dithering element 500.

To effect measurement of end 505 of optical dithering element 500 a photointerrupter 508 is utilized. Photointerrupter 508 includes a light-emitting diode 510, a phototransistor 512, and a slot 513 separating light-emitting diode 510 from phototransistor 512. The light transmission bundle across slot 513 from the light-emitting diode 510 to the phototransistor 512 is physically constrained by apertures 514 and 515. Disposed within slot 513 is an optical dithering element arm 516, which is also coupled to end 505 of optical dithering element 500. Optical dithering element arm 516 may be formed from any suitable substance that may block light transmitted across slot 514. In one embodiment, optical dithering element arm 516 is a vane made of metal.

According to the teachings of the invention, optical dithering element arm 516 is positioned slot 513 such that movement 506 of end 505 of optical dithering element 500 changes the effective size of apertures 514 and 515 by blocking a portion of the light bundle, which results in a change in current through phototransistor 512. The teachings of the invention recognize that current through phototransistor 512 varies approximately linearly with respect to the size of the apertures 514 and 515 if the current through light-emitting diode 510 is appropriately controlled. Thus, the position of end 505 of optical dithering element 500 may be determined as a function of the current through phototransistor 512. Components illustrated in FIG. 9A for measuring the position of end 505 of optical dithering element 500 may correspond, in one embodiment, to setpoint position feedback block 210 of FIG. 4A.

Associated control circuitry 518 is provided to appropriately control the light-emitting diode current and to generate feedback signals indicative of the position of end 505 of optical dithering element 500. In one example, these feedback signals include a feedback signal 520, which is an indication of whether the position of end 505 is greater or less than a desired setpoint. In this regard, signal 520 is analogous to signal 222 of FIG. 4B. Additionally, in one embodiment, a position signal indicative of the peak-to-peak swing of the position of end 505 may be provided at signal 522. Additional details of control circuitry 518 and the operation of photointerrupter 508 are described in greater detail below in conjunction with FIGS. 9B through 11.

FIG. 9B is a schematic diagram along lines 9B—9B of FIG. 9A, showing additional details of apertures 514 and 515. As illustrated in this view, optical dithering element arm 516 is positioned about halfway down the height of apertures 514 and 515. Movement along arrows 506 results in a small change in the effective size of apertures 514 and 515, as indicated by lines 517. According to one embodiment, the approximate distance moved by end 505 is about four microns. Thus, according to the teachings of the invention, a fairly small distance change may be measured by converting the distance change into current through a phototransistor. This is accomplished by recognizing that the photocurrent varies approximately linearly with respect to the size of apertures 514 and 515 if the current through light-emitting diode 510 is appropriately controlled.

FIG. 9C is a graph illustrating current through phototransistor 512 versus a height of aperture 514. As illustrated, no current flows when apertures 514 and 515 are completely blocked and maximum current flows when apertures 514 and 515 are completely un-blocked. Three curves are illustrated in FIG. 9C corresponding to three different tested photointerrupters. These three cases correspond to a high gain unit, a middle gain unit, and a low gain unit. The high gain unit corresponds to an LED current of approximately 7.04 milliamps required to produce a photocurrent of 5 amps at maximum aperture. The middle gain unit corresponds to an LED current of 10.29 milliamps to obtain 5 milliamps of photocurrent at maximum aperture. The low gain unit corresponds to an LED current of 14.7 milliamps in order to reach a photocurrent of 5 milliamps at maximum aperture. As illustrated in FIG. 9C, photocurrent varies linearly with the size of aperture 460 over a range of aperture sizes. In particular, near the middle of the aperture size, photocurrent varies very linearly with aperture size. Thus, disposing optical dithering element arm 516 such that it blocks approximately half of apertures 514 and 515 can result in a linear change in photocurrent in response to small changes in the position of optical dithering element arm 516 from its setpoint.

Figure 10:
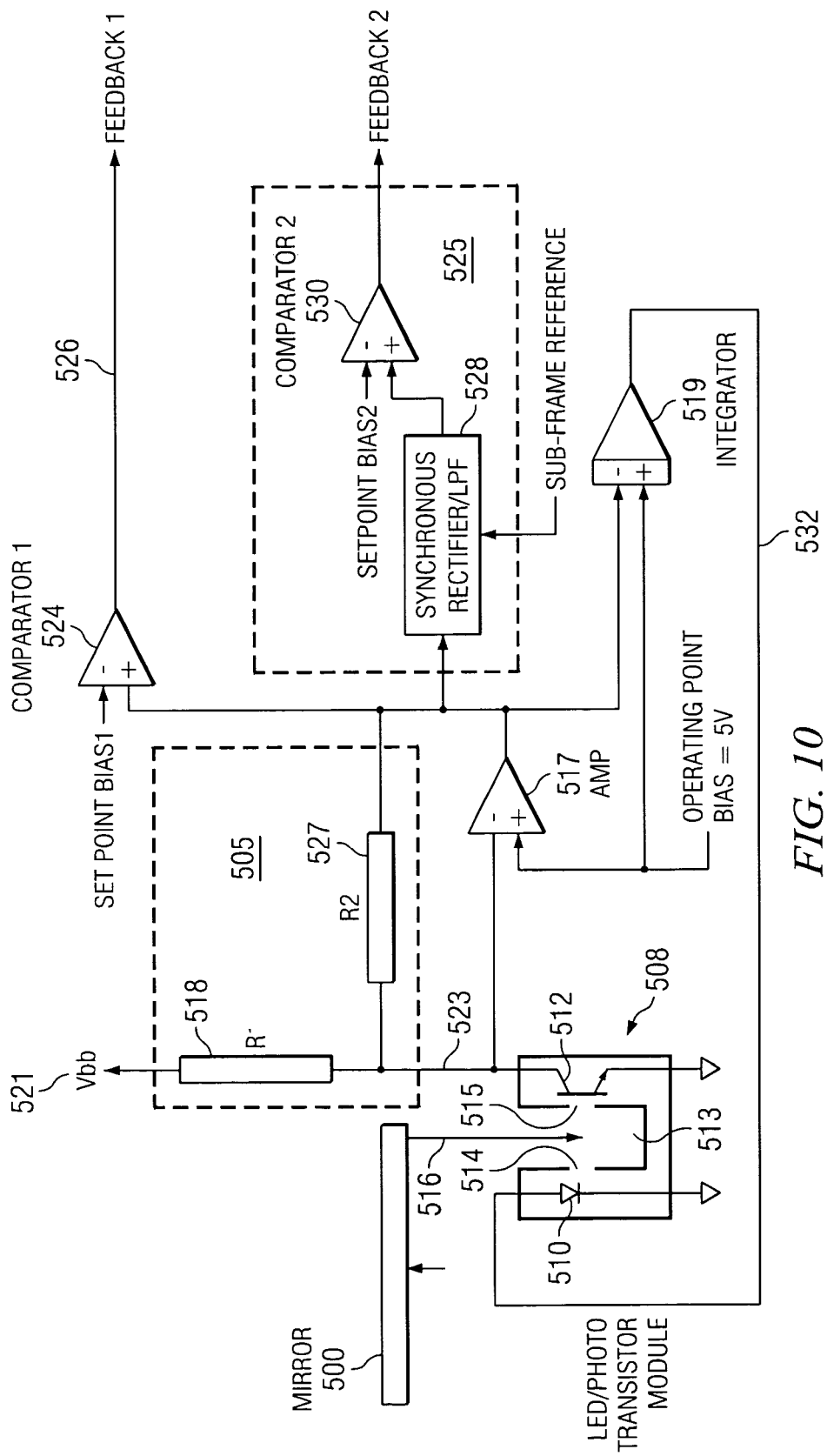
FIG. 10 is a circuit diagram illustrating control circuitry and the associated photointerrupter of FIG. 9A.

FIG. 10 is a circuit diagram illustrating additional details of photointerrupter 508 and control circuitry 518. As illustrated, photointerrupter 508 includes a light-emitting diode 510 and a phototransistor 512 separated by a slot 513. Disposed within slot 513 is an optical dithering element control arm 516 coupled to optical dithering element 500. In one embodiment, optical dithering element 500 is a mirror. According to one embodiment of the invention, a setpoint current through phototransistor 512 is set to be 2.5 milliamps, which corresponds to a particularly linear region of the photocurrent versus aperture size graph of FIG. 9C. It is changes in current about the setpoint that are indicative of the position of end 505 of mirror 500.

Setting of the phototransistor current setpoint may be achieved through use of a voltage source 521 and associated resistor 518. According to one embodiment, voltage source 521 is 10 volts and resistor 518 is 2 kilo-ohms, and thus a current of 2.5 milliamps through phototransistor 512 produces a voltage of 5 volts at node 523.

A voltage at node 523 is provided to one input of an operational amplifier 517 and compared to a second input, which receives an operating point bias. In this example, the operating point bias is 5 volts. Thus, when the current through phototransistor 512 is 2.5 milliamps, the output of operational amplifier 517 is also at 5 volts corresponding to no position change of end 505 of mirror 500.

Operational amplifier 517 produces an output at node 525. The output of node 525 is provided to an input of comparator 524. Comparator 524 compares a voltage indicative of the position of end 505 of mirror 500 to a setpoint for a desired position of end 505 of mirror 500. In one example, the setpoint bias provided to the other input of comparator 524 is set to 5.5 volts. The value of resistor 527 is selected such that the voltage at node 525 varies from the setpoint of 5 volts by approximately plus or minus 0.5 volts. In one example, the resistance of resistor 527 is 27 kiloohms.

Thus, according to the teachings of the invention, linear movement of end 505 of mirror 500 may be detected by converting this linear movement into a change in the effective size of apertures 514 and 515 of the associated photointerrupter 508 and then translating the resulting change in photocurrent into a voltage indicative of the position change of end 505 of mirror 500. The teachings of the invention recognize that the characteristics of the photocurrent versus aperture size curve, such as FIG. 9C, may vary depending on the LED current through LED 510. Thus, the current through LED 510 must be controlled such that the photocurrent versus aperture size maintains a known linear relationship such as that illustrated in FIG. 9C. This figure corresponds to a particular example in which 5 milliamps of current is achieved with maximum aperture size. But as described above, such photocurrent corresponds to varying levels of LED current based upon the gain of the photointerrupter. Thus, a controlled system is provided that maintains the LED current at a level that corresponds to 5 milliamps at the maximum aperture. This roughly corresponds, in this example, to achieving an average voltage level of 5 volts at node 525. Thus, an integrator 519, which receives the operating point bias of 5 volts, has as one input the voltage at node 525. The voltage at node 525 is integrated over time to provide a feedback signal to LED 510. Thus, if the setpoint is off, for example, case in which the setpoint photocurrent is 3 milliamps, then the voltage at node 525 is too high. This causes integrator 519 to integrate down such that it lowers LED current through LED 510. This lowering of the current brings the photocurrent back to its setpoint of 2.5 milliamps.

FIG. 10 illustrates additional circuitry that may be utilized, if desired, for additional reasons. A synchronous rectifier and low pass filter 528 is coupled at node 525 to provide an indication of the average peak-to-peak amplitude at node 525. This output is provided to one input of the comparator 530 and compared to the other input, which is a second setpoint bias. The resulting output of comparator 530 indicates whether the voltage representing the average peak-to-peak mirror movement at 505 is above or below the second setpoint bias.

Figure 11:
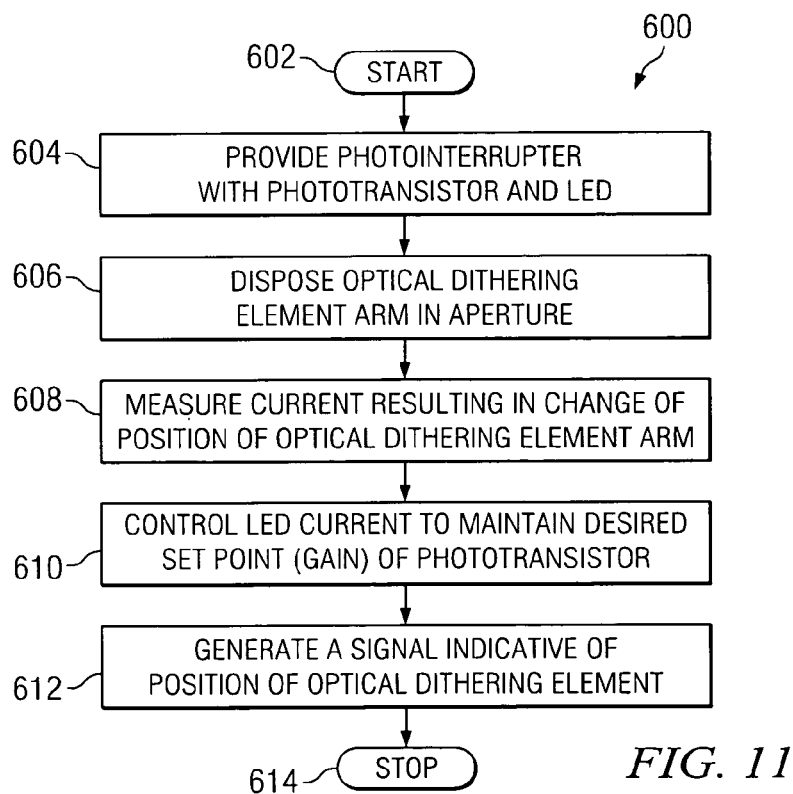
FIG. 11 is a flow chart illustrating a method for providing position feedback for an optical dithering element.

FIG. 11 is a flow chart illustrating a method 600 for providing a position indication of an optical dithering element. The method begins at step 602. At step 604 a photointerrupter having associated phototransistor and light-emitting diodes separated by an slot is provided. At a step 606 an optical dithering element arm coupled to an optical dithering element is disposed at a setpoint within the aperture of the photointerrupter. The setpoint is approximately mid way between a fully open and a fully closed aperture, such that a change in aperture size at the setpoint results in an approximate linear change in the current through the phototransistor. At step 508, the current resulting in a change of position of the optical dithering element arm in response the optical dithering element is measured. During this process, the current through the LED is controlled to maintain a desired setpoint of the phototransistor, and thus, the phototransistor has a relatively constant proportional gain with respect to changes in effective aperture size, and therefore position of the optical dithering element. At step 12 the signal is generated that is indicative of the position of the optical dithering element. The method concludes at step 614.

Although the present invention has been described in detail, it should be understood that the various changes, substitutions, and alterations could be made hereto without departing from the spirit and scope of the invention as defined by the appended claim.

What is claimed is:

1. A method for providing a position error indicator of an optical dithering element comprising:
   providing a photointerrupter comprising a light-emitting diode separated from a phototransistor by a slot with a constrained an aperture, wherein for a given size aperture, the current through the phototransistor is a function of the current through the light-emitting diode;
   disposing an optical dithering element arm at a setpoint within the aperture;
   positioning the optical dithering element to desired location and, in response, offsetting the optical dithering element arm from the setpoint within the aperture such that the amount of the aperture that is blocked relative to the amount blocked at the setpoint is indicative of the position of the optical dithering element;
   while offsetting the optical dithering element arm, controlling the current through the light-emitting diode such that a change in the amount of the aperture that is blocked results in a desired approximately proportional change in current through the phototransistor;
   based on any changes in the current through the phototransistor in response to positioning the optical dithering element, detecting a voltage indicative of the position of the optical dithering element; and
   comparing the detected voltage to a setpoint for a desired position of the optical dithering element and generating a signal indicative of the comparison.

2. The method of claim 1, wherein the optical dithering element is a mirror.

3. A method for providing position feedback for a device comprising:
   providing a photointerrupter comprising a light-emitting diode, a phototransistor, and an aperture between the light-emitting diode and the phototransistor, wherein for a given size aperture, a current through the phototransistor is a function of a current through the light-emitting diode;
   controlling the current through the light-emitting diode such that a change in an effective aperture size results in a desired approximately proportional change in the current through the phototransistor;

while controlling the current through the light-emitting diode, blocking a portion of the aperture by an arm that has a position indicative of the position of the device; and providing a signal indicative of the change in current through the photodiode in response to blocking a portion of the aperture as an indication of a change in position of the device.

4. The method of claim 3, wherein controlling the current through the light-emitting diode comprises controlling the current through the light-emitting diode by an integrator to produce a pre-determined current in the phototransistor for a given effective aperture size.

5. The method of claim 3, where blocking a portion of the aperture by an arm comprises blocking a portion of the aperture by an arm connected to the device.

6. The method of claim 3, wherein the device is an optical dithering element.

7. The method of claim 3, and further comprising initially blocking a portion of the aperture with the arm, the blocked portion being approximately half of the aperture when not blocked and wherein providing a signal indicative of a change in current comprises providing a signal indicative of the change in current from a current through the phototransistor that results when the aperture is initially partially blocked.

8. The method of claim 3, wherein blocking a portion of the aperture comprises repeatedly blocking a portion of the aperture and changing the portion of the aperture that is blocked at a frequency of at least 120 hertz.

9. The method of claim 3, wherein blocking a portion of the aperture comprises blocking a portion of the aperture that is less than about five micrometers of a height of the aperture, in addition to any portion of the aperture that is blocked when the device is at an initial position.

10. The method of claim 3, and further comprising generating a feedback signal based in part on the signal indicative of the change in current, the feedback signal indicative of the position of the device.

11. The method of claim 3, and further comprising generating a feedback signal based in part on a signal indicative of whether the position of the device exceeds or falls below a predetermined setpoint.

12. A system for position measurement of a device comprising:

a photointerrupter comprising a light-emitting diode separated from a phototransistor by an aperture, wherein the amount of current through the phototransistor is a function of the amount of current through the light-emitting diode for a set aperture size;

a device arm coupled to the device and positioned within the aperture;

a light-emitting diode controller operable to control the amount of current through the light-emitting diode such that a blockage in the size of the aperture by the device arm results in a desired approximately proportional change in current through the phototransistor.

13. A system of claim 12, and further comprising a phototransistor current detection circuit operable to detect changes in current through the phototransistor in response to blockage of portions of the aperture by the device arm.

14. The system of claim 13, wherein the current detection circuit comprises an amplifier.

15. The circuit of claim 14, wherein the light-emitting diode controller comprises an integrator that receives as inputs an operating setpoint bias and the output of the amplifier.

16. The system of claim 9, and further comprising a synchronous rectifier and a low pass filter operable to provide an indication of an average peak-to-peak position change of the optical dithering device.

17. The system of claim 12, and further comprising a phototransistor current setpoint circuit operable to generate a set amount of average current through the phototransistor.

18. The system of claim 17, wherein the phototransistor current setpoint circuit comprises a voltage source coupled in series with a resistor and an amplifier with a given operating bias point.

19. The system of claim 12, and further comprising a comparator comparing a setpoint voltage to a voltage indicative of the position of the device within the aperture.

20. The system of claim 12, wherein the device arm is a vane.

* * * * *